(12) United States Patent
Littlefield et al.

(10) Patent No.: US 10,234,019 B2
(45) Date of Patent: Mar. 19, 2019

(54) PLANETARY GEAR SET BEARING RETAINER

(71) Applicant: GM Global Technology Operations LLC, Detroit, MI (US)

(72) Inventors: Joseph R. Littlefield, Sterling Heights, MI (US); Pete R. Garcia, North Branch, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 332 days.

(21) Appl. No.: 15/068,067

(22) Filed: Mar. 11, 2016

(65) Prior Publication Data

US 2017/0261095 A1    Sep. 14, 2017

(51) Int. Cl.
*F16H 57/08* (2006.01)
*F16H 1/28* (2006.01)
*F16H 57/04* (2010.01)

(52) U.S. Cl.
CPC ............. *F16H 57/082* (2013.01); *F16H 1/28* (2013.01); *F16H 57/043* (2013.01); *F16H 57/0479* (2013.01); *F16H 57/0471* (2013.01); *F16H 2057/085* (2013.01)

(58) Field of Classification Search
CPC .. F16H 57/082; F16H 57/043; F16H 57/0479; F16H 2057/085; F16H 1/28
See application file for complete search history.

(56) References Cited

U.S. PATENT DOCUMENTS

| | | | |
|---|---|---|---|
| 2004/0094364 A1* | 5/2004 | Hammill | F16H 57/0482 57/6.12 |
| 2011/0230292 A1* | 9/2011 | Komatsu | B60K 6/365 475/5 |
| 2012/0264561 A1* | 10/2012 | Fukaya | F16H 3/66 475/276 |
| 2017/0146113 A1* | 5/2017 | Iwasaki | F16H 57/082 |

FOREIGN PATENT DOCUMENTS

JP    2016003686 A  *  1/2016  ........... F16H 57/082

* cited by examiner

*Primary Examiner* — Jacob S. Scott
*Assistant Examiner* — Lori Wu

(57) ABSTRACT

A planetary gear set assembly for a transmission includes a planet carrier, a sun gear, a ring gear, a bearing plate, and a thrust bearing placed between the sun gear and the bearing plate. The bearing plate is retained by the planetary gear carrier and includes a plurality of lubrication features for providing a lubrication path from an input shaft through the thrust bearing and bearing plate to the pinion shafts.

12 Claims, 3 Drawing Sheets

PLANETARY GEAR SET BEARING RETAINER

FIELD

The present disclosure relates to a bearing retainer plate of a planetary gear assembly and more particularly to a thrust bearing retainer for a planetary gear carrier of a planetary gear assembly.

BACKGROUND

The statements in this section merely provide background information related to the present disclosure and may or may not constitute prior art.

Planetary gear assemblies are remarkably versatile and adaptable devices. Various motor vehicle driveline components such as transmissions, differentials and transaxles make frequent and common use of planetary gear assemblies. Typically they are singly utilized to provide a speed reduction and torque increase or arranged in tandem and associated with clutches and brakes that interconnect or ground various elements of the planetary gear assemblies to provide multiple speed reductions and torque multiplications.

A simple planetary gear assembly comprises a centrally disposed sun gear, a planet gear carrier disposed generally about the sun gear and a ring gear disposed about the carrier. A plurality of planet gears rotatably mounted on shafts in the carrier engage both the sun and the ring gears.

There are, of course, many engineering issues regarding the design and manufacture of planetary gear assemblies. One involves the manner by which several planetary gear assemblies are arranged or packaged in a housing of a transmission that further includes clutches, brakes, interconnecting members and shafts. Ever increasing power and torque requirements, improved fuel economy, and improved longevity and robustness also apply more stringent specifications and smaller packaging space for designs.

Another engineering issue relates to lubrication. In certain configurations and in certain vehicle speed ranges, the rotational speed of the planet or pinion gears of a given planetary gear assembly may be quite significant, i.e., many thousand RPM. The rotational speed of the planet gear carrier may also be quite high. High planet or pinion gear speeds are not problematic per se but they do require sufficient lubrication not only to lubricate the pinion-bearing-pinion shaft interface but also to carry off heat generated by such high speed rotation at the interface.

The present invention is directed to providing an improved planetary gear set assembly which not only provides a more robust assembly but also provides improved lubrication oil paths to the planet bearings.

SUMMARY

The present invention provides planetary gear set assembly for a transmission, the planetary gear set assembly including a planet carrier assembly, a sun gear, a ring gear, a bearing plate, and a first and second thrust bearings. The planet carrier assembly has a backing portion, a spider portion, and a plurality of planet gears rotatably supported by pinion shafts. The backing portion of the planetary gear assembly is interconnected for common rotation with a first rotating member. The sun gear has a first and a second axial end. The sun gear is interconnected for common rotation with a second rotating member. The ring gear is interconnected for common rotation with a third rotating member. Each of the ring gear and the sun gear mesh with each of the plurality of planet gears of the planetary gear carrier. The bearing plate is retained by the spider portion of the planetary gear carrier. The first thrust bearing is disposed between the backing portion of the planet carrier assembly and the first axial end of the sun gear. The second thrust bearing is disposed between the bearing plate and the second axial end of the sun gear.

In another example of the present invention, the planetary gear set assembly further includes a lubrication passageway for providing pressurized hydraulic fluid to lubricate the planet gears of the planet carrier assembly. The lubrication pathway includes an axial bore that intersects a radial bore in the second rotating member, the second thrust bearing, a lubrication passageway portion between the spider portion and the bearing plate of the planet carrier assembly, and an axial bore of each of the pinion shafts.

In yet another example of the present invention, the bearing plate further includes a bearing surface and a plurality of lubrication divots. The bearing surface is an axial facing surface adjacent the inner periphery of the bearing plate. The second thrust bearing is disposed on the bearing surface. The plurality of lubrication divots are disposed radially outward from the bearing surface proximate the pinion shafts of the planet carrier assembly.

In yet another example of the present invention, an inner surface of the lubrication divots of the bearing plate in combination with an outer surface of the spider portion of the planet carrier assembly form a lubrication passageway in communication with the second thrust bearing and an axial bore of each of the pinion shafts.

In yet another example of the present invention, the bearing plate is disposed in a groove on the inner periphery of the spider portion of the planet carrier assembly and a snap ring is disposed in the groove to retain the bearing plate to the spider portion of the planet carrier assembly.

In yet another example of the present invention, the planetary gear set assembly further includes a needle bearing assembly disposed on each pinion shaft and rotationally supporting the planet gear.

In yet another example of the present invention, each of the backing portion and spider portion of the planet carrier assembly have a plurality of pinon bores. Each of the plurality of pinion bores of the backing portion are disposed coaxially with one of the plurality of bores of the spider portion. A first end of each of the pinion shafts is disposed in one of the plurality of pinion bores of the backing portion. A second end of each of the pinion shafts is disposed in one of the plurality of bores of the spider portion. The spider portion includes a semicircular scallop disposed proximate each of the plurality of bores of the spider portion. The bearing portion includes a radial extension disposed in each of the semicircular scallops of the spider portion and a lubrication divot disposed between each of the radial extensions and the inner periphery of the spider portion of the planet carrier assembly.

In yet another example of the present invention, an inner surface of the lubrication divots in combination with an outer surface of the spider portion of the planet carrier assembly form a lubrication passageway in communication with the second thrust bearing and an axial bore of each of the pinion shafts.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses in any way.

Figure 1:
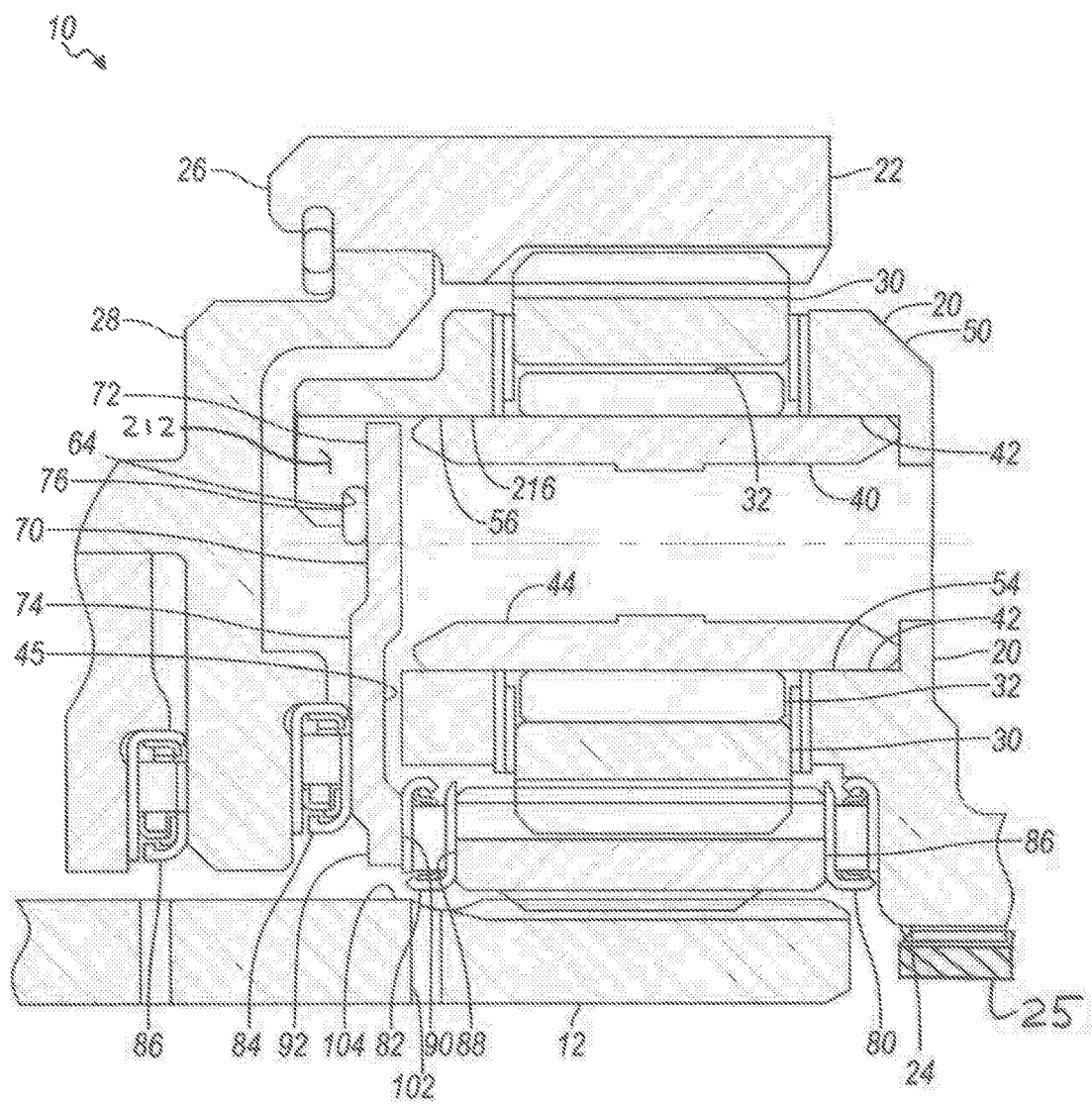
FIG. 1 is a fragmented, cross-section view of a planetary gear set assembly according to an example of the present invention.

With reference to FIG. 1, a first example of the present invention is illustrated in conjunction with a portion of a planetary gear assembly which is designated by the reference number 10. The planetary gear assembly 10 includes a hollow drive or input shaft 12, a sun gear 16, a planet gear carrier 20, and a ring gear 22. The input shaft 12 has external or male splines 14 which couple and drive the sun gear 16. The sun gear 16 has gear teeth 18 on the outside surface. The planet gear carrier 20 is preferably a weldment comprising forged or cold formed components and which is generally aligned with the sun gear 16. The planet gear carrier 20 includes an annular extension 24 having male splines or gear teeth which are engaged by associated drive or driven members 25. The ring gear 22 also includes an annular extension 26 that is engaged one of any manner of ways to achieve common rotation with an associated drive or driven member 28.

The planet gear carrier 20 also includes a plurality of planet or pinion gears 30 (one of which is shown in FIG. 1) that are rotatably supported by anti-friction bearings, such as caged roller or needle bearing assemblies 32. The roller or needle bearing assemblies 32, in turn, are received upon a respective plurality of pinion shafts 40 which are received within a plurality of pairs of spaced-apart, aligned bores 42 in the planet gear carrier 20. The number of planet or pinion gears 30, bearing assemblies 32, stub or pinion shafts 40 and pairs of aligned bores 42 may be three, four, five, six or more depending upon the torque load of the planetary gear assembly 10 and other design parameters. The pluralities of pairs of aligned bores 42, the stub or pinion shafts 40, the bearing assemblies 32 and the planet or pinion gears 30 are typically and preferably arranged or disposed parallel to and at equal angular intervals about the common axis of the input shaft 12 and the planet gear carrier 20. For example, if there are four of each of the aforementioned components, as shown in FIG. 2, they will preferably be spaced at 90° intervals about the common axis of the input shaft 12 and the planet gear carrier 20.

As illustrated in FIG. 1, the pinion shafts 40 each include a concentric, axial bore or passageway 44 that opens at each end of the shaft 40 and extends along the axis of the shaft 40. The bores 42 of the planet carrier 20 may have a closed end or the end may be open to allow for communication between the passageway 44 and the exterior of the planet carrier.

Figure 2:
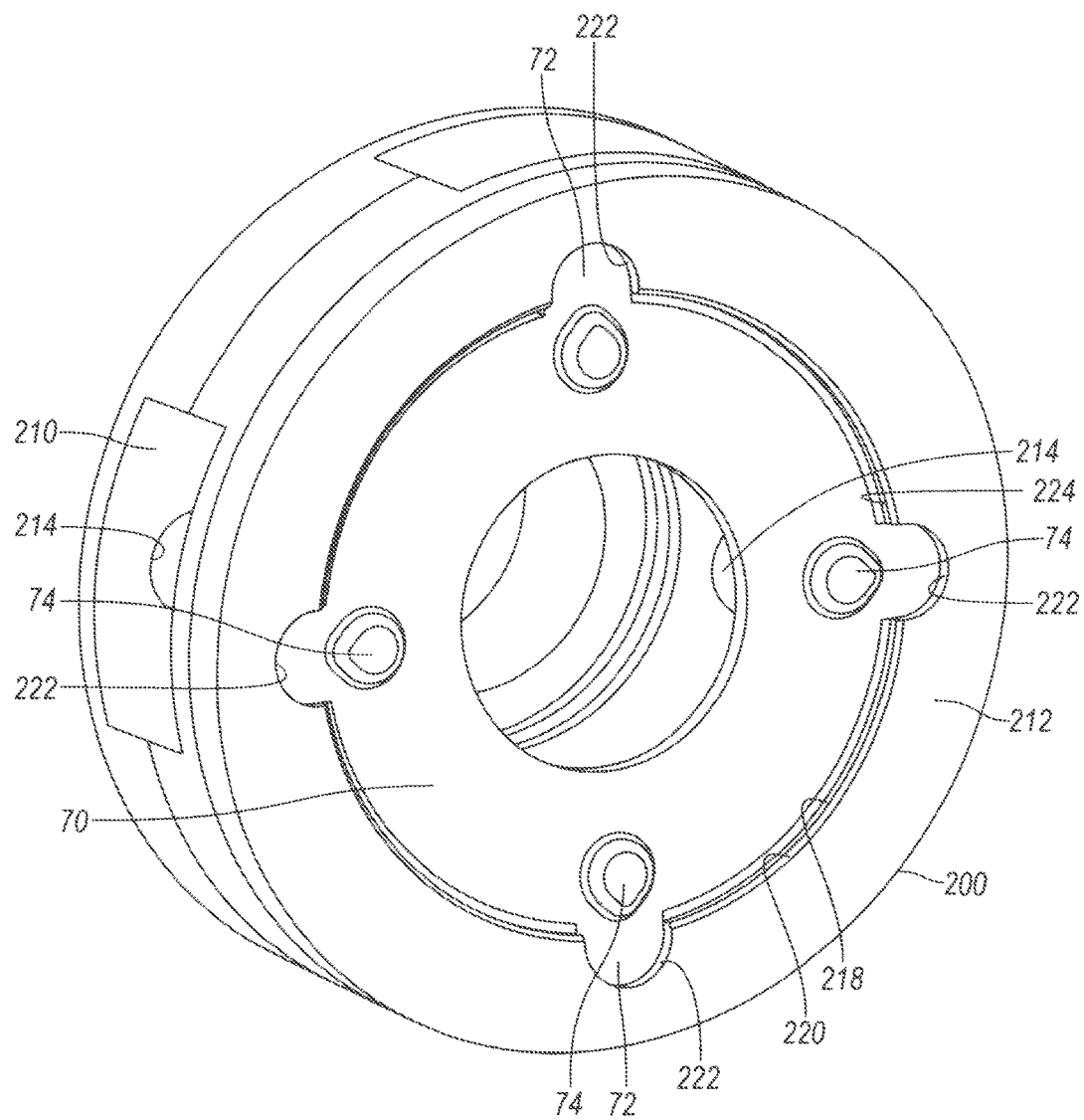
FIG. 2 is a perspective view of a carrier member of a planetary gear set assembly according to an example of the present invention.

Turning now to FIG. 2 with continuing reference to FIG. 1, a planet gear carrier 200 in accordance with an example of the present invention is illustrated and will now be described. The planet gear carrier 200 includes a backing portion or plate 210 and a spider portion or member 212. As in FIG. 1, the backing plate 210 includes a plurality of coaxial aligned bores 214 that are each aligned with one of a plurality of coaxial aligned bores 216 of the spider member 212. The spider member 212 also includes an inner periphery or edge 218 that forms a bore 220 that is coaxial with the input shaft 12.

The inner periphery or edge 218 of the spider member 212 includes a plurality of semicircular scallops 222 and a snap ring groove 224. One of the plurality of scallops 222 is disposed proximate to each of the bores 216 of the spider member 212. The scallops 222 essentially provide a relief or a passageway to allow the passageway 44 of the pinion shaft 40 to communicate outside the planet carrier member 20, 200. The snap ring groove 224 is disposed on the inner periphery or edge 218 of the spider member 212.

The planet carrier member 20, 200 further includes a bearing plate 70. The bearing plate 70 is a predominately flat stamped plate that includes a plurality of radial extensions 72 and a plurality of divots 74. The bearing plate 70 is assembled to the spider member 212 such that one of each of the plurality of radial extensions 72 and divots 74 are disposed proximate to each of the plurality of bores 216. The divots 74 of the bearing plate 70 cooperate with the pinion shaft 40 to form a lubrication passageway 45 that communicates with passageway 44 of the pinion shaft 40. The bearing plate 70 is held in place using a snap ring 76 disposed in the snap ring groove 224 of the spider member 212 and when assembled with the rest of the planetary gear set 10 extends radially inward toward the input shaft 12.

The planetary gear set assembly 10, and the transmission in general, includes a number of thrust bearings for allowing adjacent transmission members to rotate freely with respect to each other while allowing axial loads to transfer from one member to the adjacent member. For example, the planetary gear set assembly 10 includes a first thrust bearing 80, a second thrust bearing 82, a third thrust bearing 84, and a fourth thrust bearing 86. More specifically, the first thrust bearing 80 is disposed between a first end 86 of the sun gear 16 and the annular extension 24 the backing plate 50, 210 of the planet carrier member 20, 200. The second thrust bearing 82 is disposed between a second end 88 of the sun gear 16 and a first or inner surface 90 the bearing plate 70. The third thrust bearing 84 is disposed between a second or outer surface 92 of the bearing plate and the drive or driven member 28 connected to the ring gear 22. The fourth thrust bearing 86 is disposed between the drive or driven member 28 connected to the ring gear 22 and another member or transmission housing 94.

As noted above, the input shaft 12 is hollow and is pressurized with lubricating oil or hydraulic fluid. A radial port 102 in the wall of the input shaft 12 directs pressurized fluid into a radial passageway 104. The lubricating fluid is directed radially outwardly to the second thrust bearings 82, through the thrust bearings 82, and into the passageway 45 formed by the divot 74 of the bearing plate 70 and the passageway 44 of the pinon shaft 40. Thus, lubrication is provided directly to the pinion/bearing/shaft interface. Moreover, the radial passageway 45 that provides such lubrication is maintained in a radially outward orientation which minimizes the effect of high speed rotation of the planet gear carrier 20 on lubrication flow.

Figure 3:
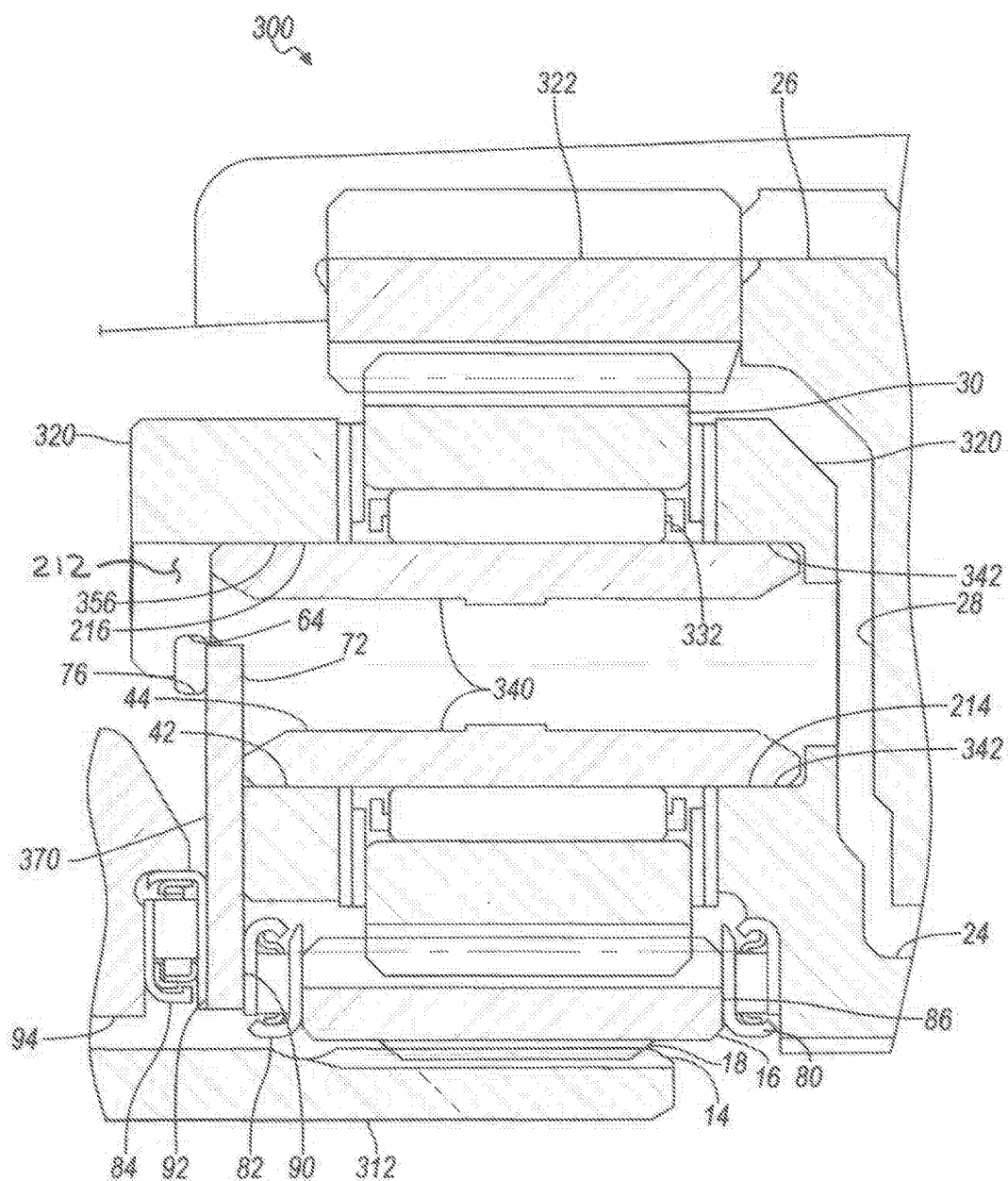
FIG. 3 is a fragmented, cross-section view of a planetary gear assembly according to an example of the present invention.

Turning now to FIG. 3 with continuing reference to FIG. 2, another example of the present invention is illustrated in conjunction with a portion of a planetary gear assembly which is designated by the reference number 300. Elements of this example that are similar to the elements of the example in FIG. 1 will share the same reference number. The planetary gear assembly 300 includes a hollow drive or input shaft 312, a sun gear 16, a planet gear carrier 320, and a ring gear 322. The input shaft 312 has external or male splines 14 which couple and drive the sun gear 16. The sun gear 16 has gear teeth 18 on the outside surface. The planet gear carrier 320 is preferably a weldment comprising forged or cold formed components and which is generally aligned with the sun gear 16. The planet gear carrier 320 includes an annular extension 24 having male splines or gear teeth which are engaged by associated drive or driven members (not shown). The ring gear 322 also includes an annular extension 26 that is engaged one of any manner of ways to achieve common rotation with an associated drive or driven member 28.

The planet gear carrier 320 also includes a plurality of planet or pinion gears 30 (one of which is shown in FIG. 3) that are rotatably supported by anti-friction bearings, such as caged roller or needle bearing assemblies 32. The roller or needle bearing assemblies 32, in turn, are received upon a respective plurality of pinion shafts 340 which are received within a plurality of pairs of spaced-apart, aligned bores 342 in the planet gear carrier 320. The number of planet or pinion gears 30, bearing assemblies 32, stub or pinion shafts 340 and pairs of aligned bores 342 may be three, four, five, six or more depending upon the torque load of the planetary gear assembly 10 and other design parameters.

The pluralities of pairs of aligned bores 342, the stub or pinion shafts 340, the bearing assemblies 332 and the planet or pinion gears 30 are typically and preferably arranged or disposed parallel to and at equal angular intervals about the common axis of the input shaft 312 and the planet gear carrier 320. For example, if there are six of each of the aforementioned components, they will preferably be spaced at 60° intervals about the common axis of the input shaft 312 and the planet gear carrier 320.

As illustrated in FIG. 3, the pinion shafts 340 each include a concentric, axial bore or passageway 44 that opens at each end of the shaft 340 and extends along the axis of the shaft 340. The bores 342 of the planet gear carrier 320 may have a closed end or the end may be open to allow for communication between the passageway 44 and the exterior of the planet carrier.

The planet gear carrier 320 includes a backing portion or plate 50 and a spider portion or member 52. As in FIG. 1, the backing plate 50 includes a plurality of coaxial aligned bores 356 that are each aligned with one of a plurality of coaxial aligned bores 342 of the spider member 52. The spider member 52 also includes an inner periphery or edge 58 that forms a bore 60 that is coaxial with the input shaft 312.

The inner periphery or edge 58 of the spider member includes a plurality of semicircular scallops 62 and a snap ring groove 64. One of the plurality of scallops 62 is disposed proximate to each of the bores 356 of the spider member 52. The scallops 62 essentially provide a relief or a passageway to allow the passageway 44 of the pinion shaft 340 to communicate outside the planet carrier member 20. The snap ring groove 64 is disposed on the inner periphery or edge 58 of the spider member 52.

The planet carrier member 320 further includes a bearing plate 370. The bearing plate 370 is a predominately flat stamped plate that includes a plurality of radial extensions 72. The bearing plate 370 is assembled to the spider member 52 such that one of each of the plurality of radial extensions 72 are disposed proximate to each of the plurality of bores 342. The bearing plate 370 is held in place using a snap ring 76 disposed in the snap ring groove 64 of the spider member 52 and when assembled with the rest of the planetary gear set 310 extends radially inward toward the input shaft 312.

In all the examples provided herein, the planetary gear set assembly 10, 300, and the transmission in general, includes a number of thrust bearings for allowing adjacent transmission members to rotate freely with respect to each other while allowing axial loads to transfer from one member to the adjacent member. For example, the planetary gear set assembly 10, 300 includes a first thrust bearing 80, a second thrust bearing 82, and a third thrust bearing 84. More specifically, the first thrust bearing 80 is disposed between a first end 86 of the sun gear 16 and the annular extension 24 the backing plate 50 of the planet carrier member 20. The second thrust bearing 82 is disposed between a second end 88 of the sun gear 16 and a first or inner surface 90 the bearing plate 70. The third thrust bearing 84 is disposed between a second or outer surface 92 of the bearing plate and another member or transmission housing 94.

The foregoing description of the invention is merely exemplary in nature and variations that do not depart from the gist of the invention are and are intended to be within the scope of the invention. Such variations are not to be regarded as a departure from the spirit and scope of the invention and the following claims.

What is claimed is:

1. A planetary gear set assembly for a transmission, the planetary gear set assembly comprising:
   a planet carrier assembly having a backing portion, a spider portion, and a plurality of planet gears rotatably supported by pinion shafts, and wherein the backing portion of the planetary gear assembly is interconnected for common rotation with a first drive member;
   a sun gear having a first and a second axial end, and wherein the sun gear is interconnected for common rotation with a second drive member;
   a ring gear interconnected for common rotation with a third drive member, and wherein each of the ring gear and the sun gear mesh with each of the plurality of planet gears of the planetary gear carrier;
   a bearing plate retained by the spider portion of the planetary gear carrier, the bearing plate including a bearing surface and a plurality of lubrication divots, and wherein the bearing surface is an axial facing surface adjacent an inner periphery of the bearing plate, and the plurality of lubrication divots are disposed radially outward from the bearing surface proximate the pinion shafts of the planet carrier assembly; and
   a first and second thrust bearing, and wherein the first thrust bearing is disposed between the backing portion of the planet carrier assembly and the first axial end of the sun gear and the second thrust bearing is disposed between the bearing plate and the second axial end of the sun gear and the second thrust bearing is disposed on the bearing surface.

2. The planetary gear set assembly of claim 1 further including a lubrication passageway for providing pressurized hydraulic fluid to lubricate the planet gears of the planet carrier assembly, and wherein the lubrication passageway includes an axial bore that intersects a radial bore in the second drive member, the second thrust bearing, a lubrication passageway portion between the spider portion and the bearing plate of the planet carrier assembly, and an axial bore of each of the pinion shafts.

3. The planetary gear set assembly of claim 1 wherein an axially inner surface of the lubrication divots of the bearing plate in combination with an axially outer surface of the spider portion of the planet carrier assembly form a lubrication passageway in communication with the second thrust bearing and an axial bore of each of the pinion shafts.

4. The planetary gear set assembly of claim 3 wherein the bearing plate is disposed in a first groove on an inner periphery of the spider portion of the planet carrier assembly and a snap ring is disposed in a second groove to retain the bearing plate to the spider portion of the planet carrier assembly.

5. The planetary gear set assembly of claim 4 further including a needle bearing assembly disposed on each pinion shaft and rotationally supporting the planet gear.

6. The planetary gear set assembly of claim 1 wherein each of the backing portion and spider portion of the planet carrier assembly have a plurality of pinon bores, each of the plurality of pinion bores of the backing portion are disposed coaxially with one of the plurality of bores of the spider portion, a first end of each of the pinion shafts is disposed in one of the plurality of pinion bores of the backing portion, a second end of each of the pinion shafts is disposed in one of the plurality of bores of the spider portion, the spider portion includes a semicircular scallop disposed proximate each of the plurality of bores of the spider portion, the bearing plate includes a radial extension disposed in each of the semicircular scallops of the spider portion and one of the plurality of lubrication divots disposed between each of the radial extensions and a radially inner periphery of the spider portion of the planet carrier assembly.

7. The planetary gear set assembly of claim 6 wherein an axially inner surface of the lubrication divots in combination with an axially outer surface of the spider portion of the planet carrier assembly form a lubrication passageway in communication with the second thrust bearing and an axial bore of each of the pinion shafts.

8. A planetary gear set assembly for a transmission, the planetary gear set assembly comprising:
   a planet carrier assembly having a backing plate, a spider member secured to the backing plate, a plurality of pinion shafts each having a first end retained by the backing plate and a second end retained by the spider member, a needle bearing assembly disposed on each of the pinion shafts, and a plurality of planet gears each rotatably supported by the needle bearing assembly and pinion shaft;
   a sun gear having a first axial end, a second axial end, an inner spline surface, and an outer gear surface, and wherein the inner spline surface is fitted to an input member for common rotation;
   a ring gear connected for common rotation with a first drive member, and wherein each of the ring gear and the sun gear mesh with each of the plurality of planet gears of the planetary gear carrier;
   a bearing plate retained by the spider member of the planet carrier assembly, and wherein the bearing plate includes a plurality of lubrication divots each disposed between a radially inner periphery of the bearing plate and the pinion bore of the spider member; and
   a thrust bearing disposed between an axially inner surface of the bearing plate and the sun gear; and
   wherein the bearing plate further includes a bearing surface and a plurality of lubrication divots, the bearing surface is an axial facing surface adjacent an inner periphery of the bearing plate, the thrust bearing is disposed on the bearing surface, the plurality of lubrication divots are disposed radially outward from the bearing surface proximate the pinion shafts of the planet carrier assembly, an axially inner surface of the lubrication divots of the bearing plate in combination with an axially outer surface of the spider member of the planet carrier assembly form a lubrication passageway in communication with the thrust bearing and a first axial bore of each of the pinion shafts, the bearing plate is disposed in a first groove on an inner periphery of the spider portion of the planet carrier assembly and a snap ring is disposed in a second groove to retain the bearing plate to the spider portion of the planet carrier assembly.

9. The planetary gear set assembly of claim 8 wherein the lubrication passageway includes a second axial bore that intersects a radial bore in the input member, the thrust bearing, a first portion of the lubrication passageway disposed between the spider member and the bearing plate of the planet carrier assembly, and the first axial bore of each of the pinion shafts.

10. The planetary gear set assembly of claim 8 wherein each of the backing plate and spider member of the planet carrier assembly have a plurality of pinon bores, each of the plurality of pinion bores of the backing plate are disposed coaxially with one of the plurality of bores of the spider member, a first end of each of the pinion shafts is disposed in one of the plurality of pinion bores of the backing plate, a second end of each of the pinion shafts is disposed in one of the plurality of bores of the spider member, the spider member includes a semicircular scallop disposed proximate each of the plurality of bores of the spider member, the bearing plate includes a radial extension disposed in each of the semicircular scallops of the spider member and a lubrication divot disposed between each of the radial extensions and a radially inner periphery of the spider member of the planet carrier assembly.

11. A multi-speed transmission for a vehicle, the transmission comprising:
   an input member;
   a first and second drive members;
   a planetary gear set assembly having a thrust bearing, a planet carrier assembly, a sun gear, and a ring gear, and wherein the input member is interconnected for common rotation with the sun gear, the first drive member is connected for common rotation with the planet carrier assembly, and the second drive member is connected for common rotation with the ring gear; and
   wherein the planet carrier assembly includes a backing plate, a spider member secured to the backing plate, a bearing plate, a plurality of pinion shafts each having a first end retained by the backing plate and a second end retained by the spider member, a needle bearing assembly disposed on each of the pinion shafts, and a plurality of planet gears each rotatably supported by the needle bearing assembly and pinion shaft; and
   wherein the bearing plate is retained by the spider member of the planet carrier assembly, the bearing plate includes a plurality of lubrication divots each disposed between a radially inner periphery of the bearing plate, a pinion bore of the spider member, the thrust bearing is disposed between an axially inner surface of the bearing plate and the sun gear, the planetary gear set assembly further includes a lubrication passageway for providing pressurized hydraulic fluid to lubricate the needle bearing assemblies and planet gears of the planet carrier assembly, the lubrication passageway includes an axial bore that intersects a radial bore in the input member, the thrust bearing, a portion of the lubrication passageway between the spider member, the lubrication divots of the bearing plate of the planet carrier assembly, and an axial bore of each of the pinion shafts, the bearing plate is disposed in a first groove on an inner periphery of the spider portion of the planet carrier assembly and a snap ring is disposed in a second groove to retain the bearing plate to the spider portion of the planet carrier assembly.

12. The multi-speed transmission of claim 11 wherein an axially inner surface of the lubrication divots in combination with an axially outer surface of the spider member of the planet carrier assembly form the lubrication passageway in communication with the thrust bearing and the axial bore of each of the pinion shafts.

* * * * *